United States Patent
Terada

(10) Patent No.: US 6,587,270 B2
(45) Date of Patent: Jul. 1, 2003

(54) SHAKE CORRECTING APPARATUS

(75) Inventor: Shuichi Terada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/769,470

(22) Filed: Jan. 26, 2001

(65) Prior Publication Data

US 2001/0014213 A1 Aug. 16, 2001

(30) Foreign Application Priority Data

Jan. 31, 2000 (JP) ........................... 2000-021070

(51) Int. Cl.$^7$ ............................ G02B 27/64; G03B 17/00
(52) U.S. Cl. ......................... 359/554; 359/557; 396/52; 396/55
(58) Field of Search ................. 359/554–557, 359/694–706, 813–824; 396/52–55

(56) References Cited

U.S. PATENT DOCUMENTS 5,835,799 A    11/1998  Washisu  ................. 396/55

FOREIGN PATENT DOCUMENTS

| JP | 10-26779  | 1/1998 |
| JP | 10-26780  | 1/1998 |
| JP | 11-135597 | 5/1999 |
| JP | 11-212134 | 8/1999 |

Primary Examiner—Thong Nguyen
(74) Attorney, Agent, or Firm—Fitzpatrick, Cella, Harper & Scinto

(57) ABSTRACT

A shake correcting apparatus including a bottom board, a supporting frame for supporting a correction system, and an electromagnetic driving system formed of a coil unit and a permanent magnet, where shake correction is performed by driving the correction system using the electromagnetic driving system. A space for accommodating a thickness variation in the coil unit is provided at a surface of the coil unit not opposing the permanent magnet. In this manner, a predetermined gap between the coil unit and the permanent magnet may be achieved.

4 Claims, 17 Drawing Sheets

SHAKE CORRECTING APPARATUS

BACKGROUND OF THE INVENTION

1. Field of the Invention

The present invention relates to an improved shake correcting apparatus for correcting shake, e.g., in a camera, by driving a correcting system using electromagnetic driving means which comprises a coil unit and a permanent magnet.

2. Description of the Related Art

In recent cameras, principal image pick-up operations such as exposure time determination and focusing have been entirely automated, so that even people inexperienced in camera operation can perform image pick-up with rare failure.

Also, a system for preventing shake applied to a camera has been recently developed, so that there is no factor inducing failure in image pick-up.

A system for preventing camera shake will now be simply described.

Camera-shake generally has frequencies of 1 to 10 Hz. A basic concept for enabling image pick-up while eliminating shake, even when such shake is produced at the time of shutter release, is that vibration due to camera-shake is detected and a correction lens displaced according to the detected value. Therefore, in order to take a photograph without image-shake, even when camera-shake is produced, it is required that vibration of a camera is first detected and then changes in an optical axis due to the camera-shake are corrected.

The vibration (camera-shake) is principally detected by attaching vibration detecting means to a camera for detecting linear acceleration, angular acceleration, angular velocity, angular displacement, and so forth, and for properly computing the output for camera-shake correction. Based on the detected information, image-shake control is performed by driving a camera-shake correcting apparatus that varies an image pick-up optical axis.

A conventional camera-shake correcting apparatus such as the apparatus disclosed in Japanese Patent Laid-Open No. 10-26779 comprises a supporting frame for supporting a lens or an image pick-up element, a correcting system having a permanent magnet fixed to the supporting frame for generating a magnetic field approximately parallel to an optical axis of the lens or the image pick-up element, and a supporting member for supporting the correcting system movably on a surface orthogonal to the optical axis and having a coil at a position opposing the permanent magnet for the purpose of reducing the size and weight of the apparatus.

In order to drive the supporting frame by such a shake correcting apparatus in a plane orthogonal to an optical axis of the lens or the image pick-up element, a permanent magnet (which is not a coil requiring connections for electric supply) is provided on a side of the correction system (the supporting frame side), so as to eliminate any requirement for supplying electricity to the correction system to drive it, and so as to dispense with any connection process required for electric supply.

FIGS. 12 and 13 illustrate a specific structure, in which yokes 505p and 505y having permanent magnets 503p and 503y respectively adhered thereon are fixed to a supporting frame 502 for supporting a correction lens 501 by crimping or screwing (permanent magnets 503p and 503y have complimentary structures in the pitch and yaw orientations, respectively; thus, for simplicity only the permanent magnet 503p is shown in FIG. 13). Coils 507p and 507y are attached on a surface of a bottom board 506 opposing the permanent magnets 503p and 503y (coils 507p and 507y have complimentary structures in the pitch and yaw orientations, respectively; thus, for simplicity only coil 507y is shown in FIG. 13).

In a shake correcting apparatus disclosed in Japanese Patent Laid-Open No. 10-26780, as shown in FIGS. 14A to 14C, a coil 507p (507y) having substantially the same structure as mentioned above is fixed to a bottom board (not shown) for supporting the correction lens with claws 509, etc., via a frame board 508 so as to simplify assembling.

In a shake correcting apparatus disclosed in Japanese Patent Laid-Open No. 11-212134, as shown in FIG. 15, a coil unit 606p having a coil 605 is pulled in and fixed to a bottom board 601 with a screw 604 inserted into a hole 603 from the bottom surface of the bottom board 601 as viewed in the drawing. In order to maintain high accuracy in an air gap, coil retainers 607 and 608 are formed on the bottom board 601, enabling the coil unit 606p to be positioned so that it is difficult to separate coil unit 606p from positioning projections 609. The coil retainers 607 and 608 also prevent the coil unit 606p from being warped and deflected when it is pulled in with the screw 604 so as to avoid interfering with permanent magnet 610p, etc. In addition, a substrate 602 is provided for mounting electrical components.

Also, in an actuator for a vibration proof apparatus disclosed in Japanese Patent Laid-Open No. 11-135597, as shown in FIG. 16, there are arranged a magnet 701, a coil 702 disposed so as to oppose the magnet 701 for supplying a driving force to the magnet 701 by electric charging, and a damper board 703 being a non-magnetic metallic plate and disposed between the magnet 701 and the coil 702, so that a damping effect is obtained by utilizing magnetic friction produced between the damper board 703 and the magnet 701. The coil 702 is fixed to the damper board 703, thereby facilitating control of an air gap between the magnet 701 and the coil 702; inserting the damper board 703 thus enables the structure to restrain any increase in the air gap as much as possible.

In a shake correcting apparatus as described above, stabilizing a driving force for correcting a shake is required; however, there has been a problem of large individual differences in the generated driving force from one apparatus to another apparatus because, when the thicknesses of the coil, which is liable to vary widely due to manufacturing error, and the coil unit formed of the coil are changed, the air gap between the permanent magnet and the coil, which has a large effect on the driving force for correcting the shake, is also changed.

As the air gap decreases, the driving force is increased; however, there has been a limit in the amount the air gap may be decreased while still avoiding contact between the coil and the permanent magnet due to a warp of the coil. For example, a structure disclosed in Japanese Patent Laid-Open No. 11-212134, shown in FIG. 15, is provided to improve accuracy in the air gap; however, since the coil unit 606p is pulled in and fixed to the bottom board 601 with the screw 604 inserted into the hole 603 from the bottom surface of the bottom board 601 as viewed in the drawing, an abutting face of the coil unit 606p is not a surface opposing the permanent magnet 610p, but an opposite surface thereto, so that when the thickness of the coil unit 606p varies, an air gap between the permanent magnet 610p and the coil 605 also varies. Although forming the coil retainers 607 and 608 on the bottom board 601 prevents the coil unit 606p from being warped and deflected when it is pulled in with the screw 604 so as to avoid interfering with a permanent magnet 610p, etc., since the position of the coil 605 is not always restricted by the coil retainers 607 and 608, variation in an air gap cannot be reliably prevented.

Also, in an actuator for a vibration proof apparatus disclosed in Japanese Patent Laid-Open No. 11-135597, as shown in FIG. 16, although fixing the coil 702 to the damper board 703 facilitates controlling the size of an air gap between the magnet 701 and the coil 702, since there is rarely a gap between a bottom board 704 and the coil 702, when the thickness of the coil 702 varies (e.g., becomes larger, as shown in FIG. 17), the air gap also varies. That is, fixing the coil 702 to the damper board 703, alone, cannot absorb variation in the thickness of the coil 702.

SUMMARY OF THE INVENTION

It is one object of the present invention to provide a shake correcting apparatus capable of reducing individual differences in a driving force for correcting shake due to manufacturing errors of the coil unit and the permanent magnet and to deformation in assembling.

It is another object of the present invention to provide a shake correcting apparatus capable of improving reliability in correcting a shake.

In one aspect, the present invention relates to a shake correcting apparatus comprising a bottom board, a supporting frame for supporting a shake correcting optical system, and an electromagnetic driving unit that drives the shake correcting optical system to perform shake correction. The electromagnetic driving unit comprises a coil unit attached to one of the bottom board and the supporting frame and a permanent magnet attached to the other one of the bottom board and the supporting frame, where the coil unit and permanent magnet have opposing surfaces. The shake correcting apparatus further comprises means for forming a space for absorbing a thickness variation of one of the coil unit and the permanent magnet on at least one of respective sides of the coil unit and the permanent magnet opposite the opposing surfaces of the coil unit and the permanent magnet.

In another aspect, the present invention relates to a shake correcting apparatus comprising a bottom board, a supporting frame for supporting a shake correcting optical system, and an electromagnetic driving unit that drives the shake correcting apparatus to perform shake correction. The electromagnetic driving unit comprises a coil attached to one of the bottom board and the supporting frame and a permanent magnet attached to the other one of the bottom board and the supporting frame, and the shake correcting apparatus further comprises a restricting member formed of a non-magnetic and conductive material that maintains constant a size of a gap between the coil and the permanent magnet.

In another aspect, the present invention relates to a shake correcting apparatus comprising a bottom board, a supporting frame for supporting a shake correcting optical system, and an electromagnetic driving unit that drives the supporting frame to perform shake correction. The electromagnetic driving unit comprises a coil attached to one of the bottom board and the supporting frame, and a permanent magnet attached to the other one of the supporting frame and the bottom board, and the shake correction apparatus further comprises an adjusting member for adjustably setting a gap between the coil and the permanent magnet.

In another aspect, the present invention relates to a shake correcting apparatus comprising a bottom board, a supporting frame for supporting a shake correcting optical system, and an electromagnetic driving device comprising a coil attached to one of the bottom board and the supporting frame and a permanent magnet attached to the other one of the bottom board and the supporting frame, where an electromagnetic driving force is generated between the coil and the permanent magnet by passing a current through the coil, and the supporting member is driven by the driving force on a plane orthogonal to an optical axis. The shake correcting apparatus further comprises a damper member attached to one of the bottom board and the supporting frame and further attached to one of opposing surfaces of the coil and the permanent magnet, where the damper member maintains the coil and the permanent magnet at a predetermined spacing.

In another aspect, the present invention relates to a shake correcting apparatus comprising a bottom board, a supporting frame for supporting a shake correcting optical system, and an electromagnetic driving device comprising a coil attached to one of the bottom board and the supporting frame and a permanent magnet attached to the other one of the bottom board and the supporting frame, where the electromagnetic driving device generates a driving force between the coil and the permanent magnet by passing a current through the coil, and the supporting member is driven by the driving force on a plane orthogonal to an optical axis. The shake correcting apparatus further comprises an adjusting member attached to one of the bottom board and the supporting frame, and further provided on one of opposing surfaces between the coil and the permanent magnet, where the thickness of the adjusting member is predetermined to set a size of a gap between the coil and the permanent magnet, and wherein the permanent magnet is opposed to the coil at a predetermined spacing.

Effects of the present invention are summarized as follows.

1) In a shake correcting apparatus in which a correcting system is electromagnetic driven by electromagnetic driving means comprising a coil unit and a permanent magnet so as to correct shake, a space for absorbing any thickness variation of the coil unit or the permanent magnet is arranged on at least one of two respective sides opposite the opposing surfaces between the coil unit and the permanent magnet, thereby reducing individual differences in the shake correction driving force from one apparatus to another apparatus due to manufacturing errors or deformation in assembling of the coil unit and the permanent magnet, etc.

2) At least one of the coil unit and the permanent magnet is supported relative to the bottom board or the supporting frame via an intermediate member, thereby reducing individual differences in the shake correction driving force from one apparatus to another apparatus due to manufacturing errors or deformation in assembling of the coil unit and the permanent magnet, etc.

3) The above-mentioned intermediate member is formed of a non-magnetic and conductive material so as to have a known damping effect, enabling the apparatus to be miniaturized, and improving reliability.

4) The coil (or the coil unit) held by the bottom board or the supporting frame is arranged so as to control the size of a gap between the permanent magnet and the coil by using the damper member, thereby reducing individual differences in the shake correction driving force from one apparatus to another apparatus due to manufacturing errors or deformation in assembling of the coil unit and the permanent magnet, etc., enabling the apparatus to be miniaturized, and improving reliability.

5) At least one of the coil (or the coil unit) and the permanent magnet is supported relative to the bottom board or the supporting frame via an adjusting member for adjusting the size of a gap between the coil and the permanent magnet, thereby reducing individual differences in the shake correction driving force from one apparatus to another apparatus due to manufacturing errors or deformation in assembling of the coil unit and the permanent magnet, etc.

6) The above-mentioned adjusting member is formed as a single unit with the yoke, enabling the apparatus to be miniaturized.

Further objects, features and advantages of the present invention will become apparent from the following description of the preferred embodiments with reference to the attached drawings.

DESCRIPTION OF THE PREFERRED EMBODIMENTS

Figure 1:
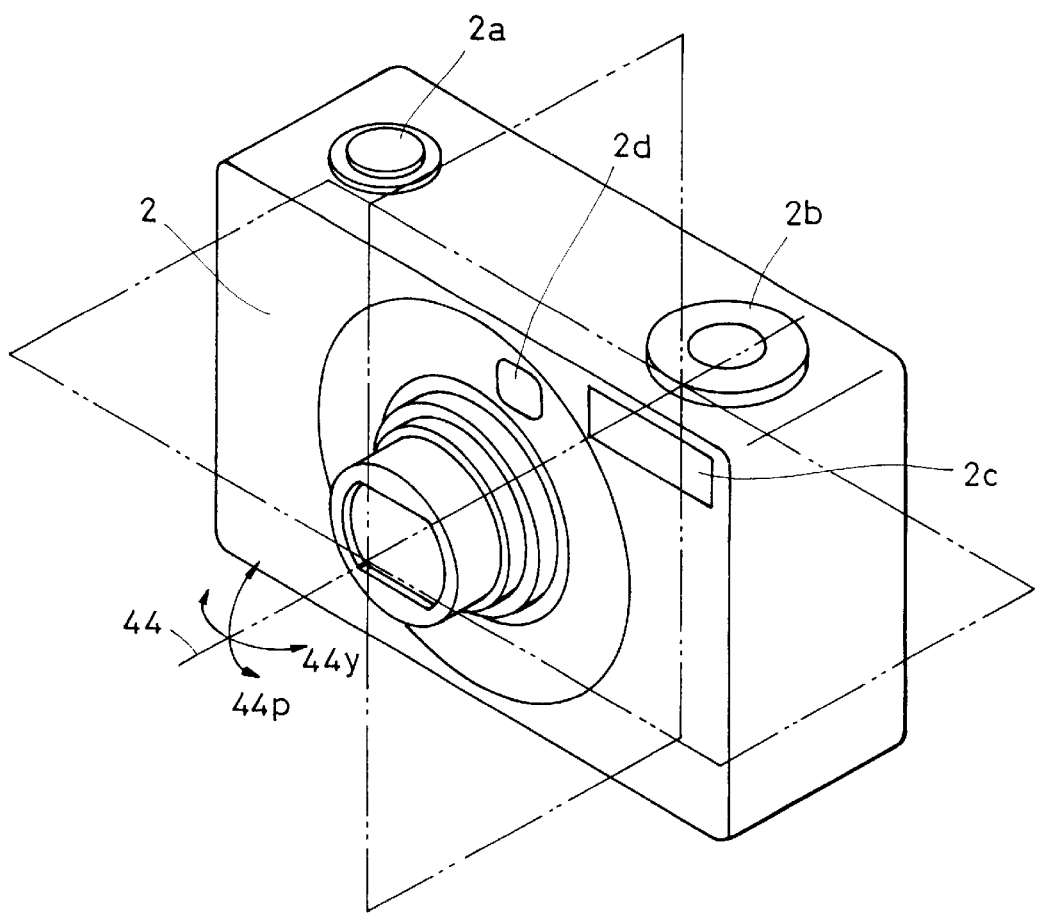
FIG. 1 is an exterior view of a camera having a shake correcting apparatus according to a first embodiment of the present invention.

The present invention will be described in detail based on preferred embodiments shown in the drawings.

Figure 2:
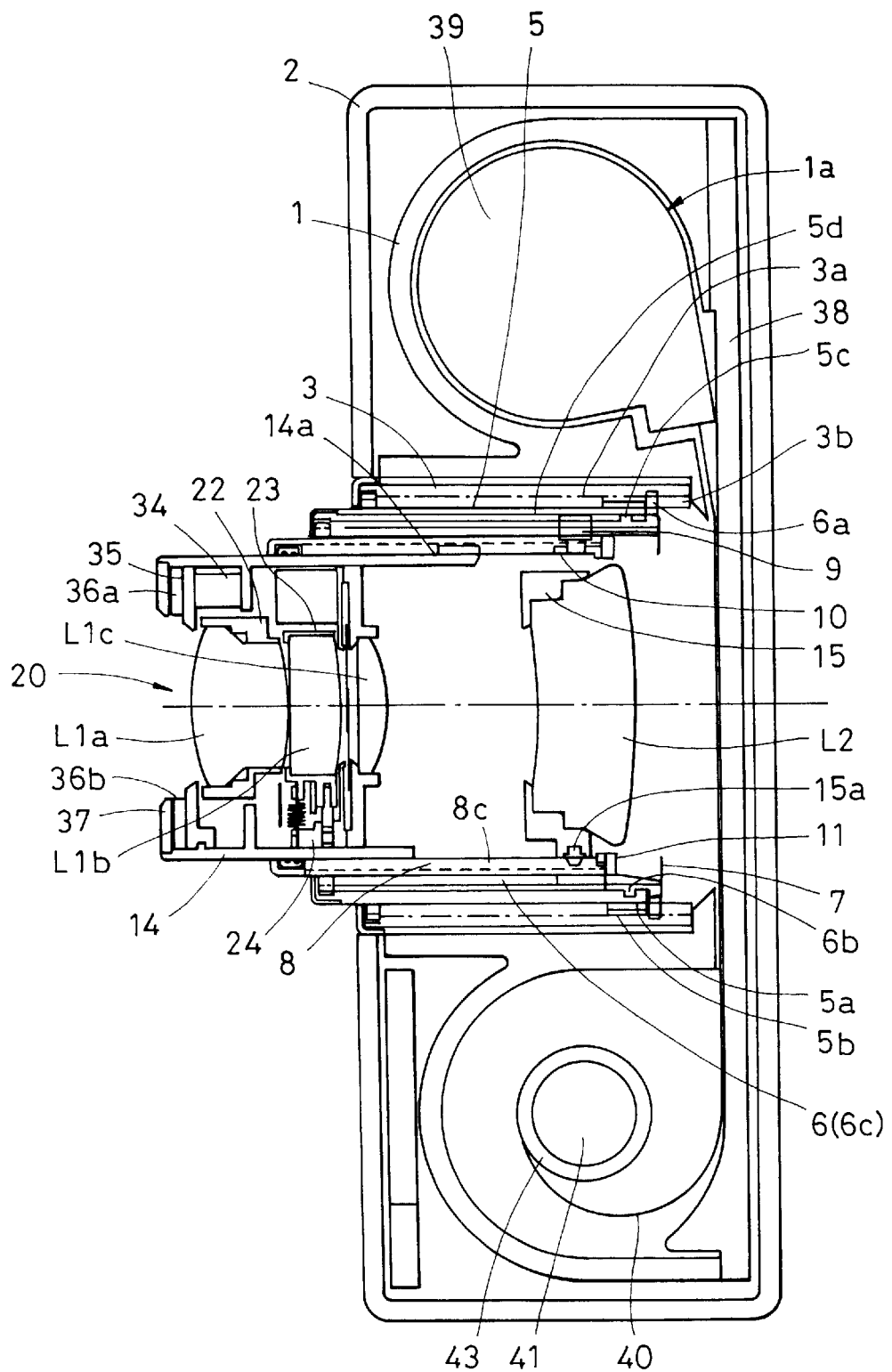
FIG. 2 is a transverse sectional view at the position indicated by a phantom line in FIG. 1 when the photographic system is in a telescopic mode.
Figure 3:
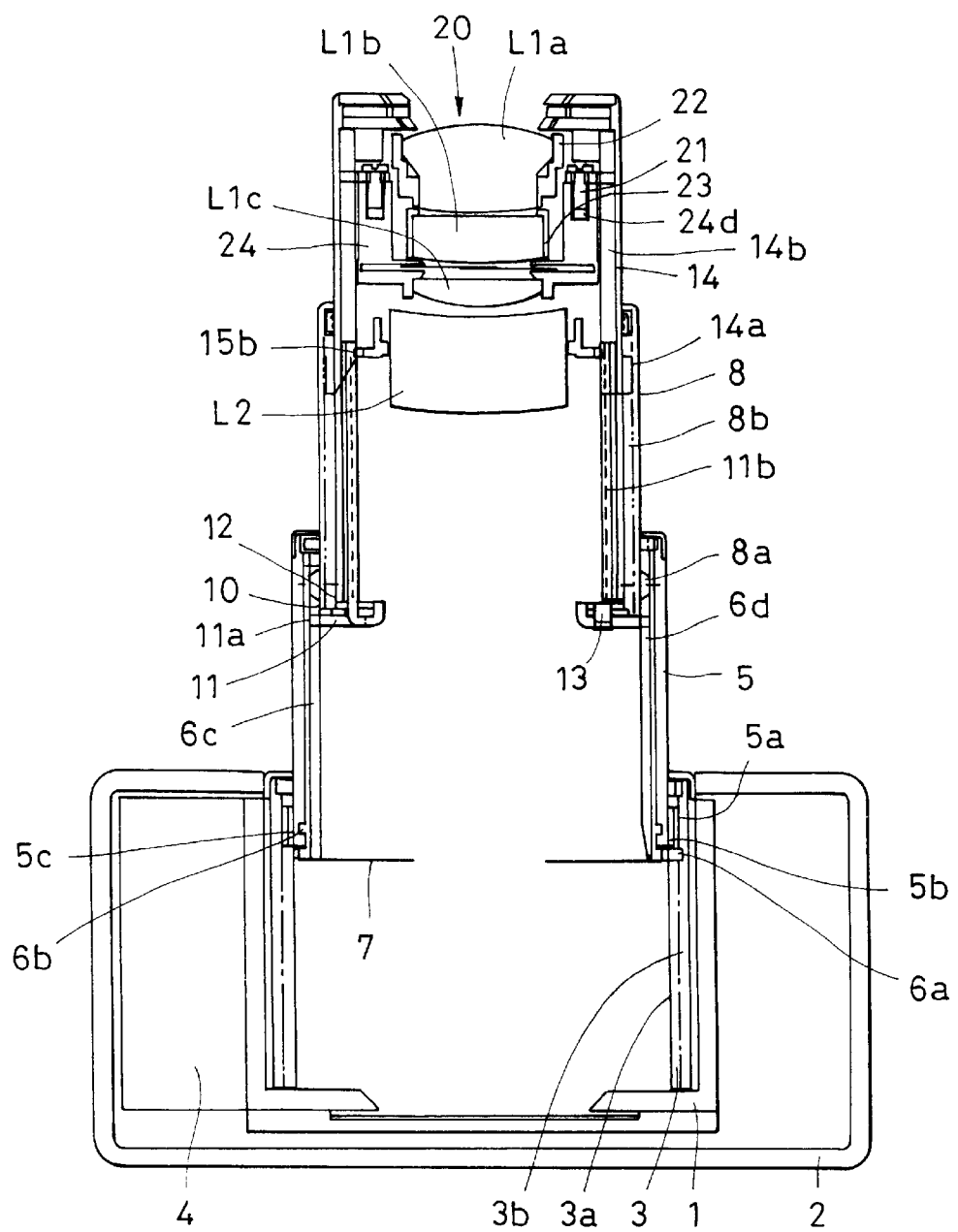
FIG. 3 is a longitudinal sectional view at the position indicated by a phantom line in FIG. 1 when the photographic system is in a telescopic mode.
Figure 4:
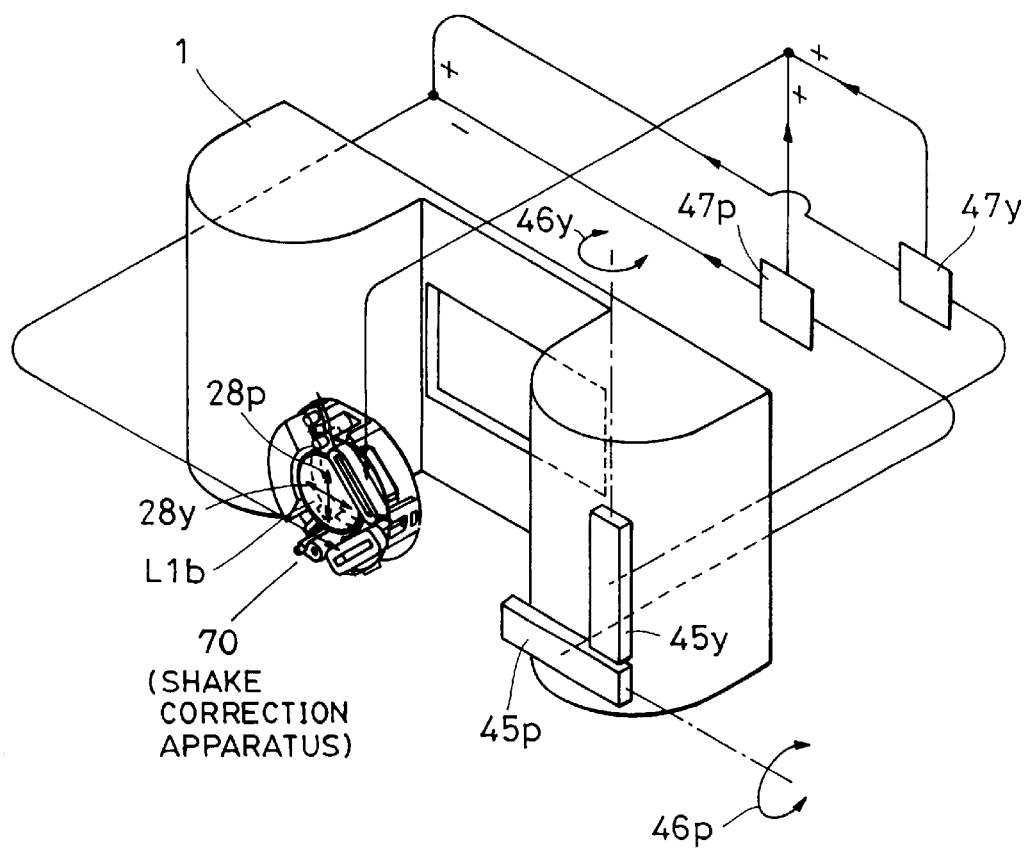
FIG. 4 is a perspective view of the shake correcting apparatus and related portions thereof which are equipped in the camera shown in FIG. 1.
Figure 5:
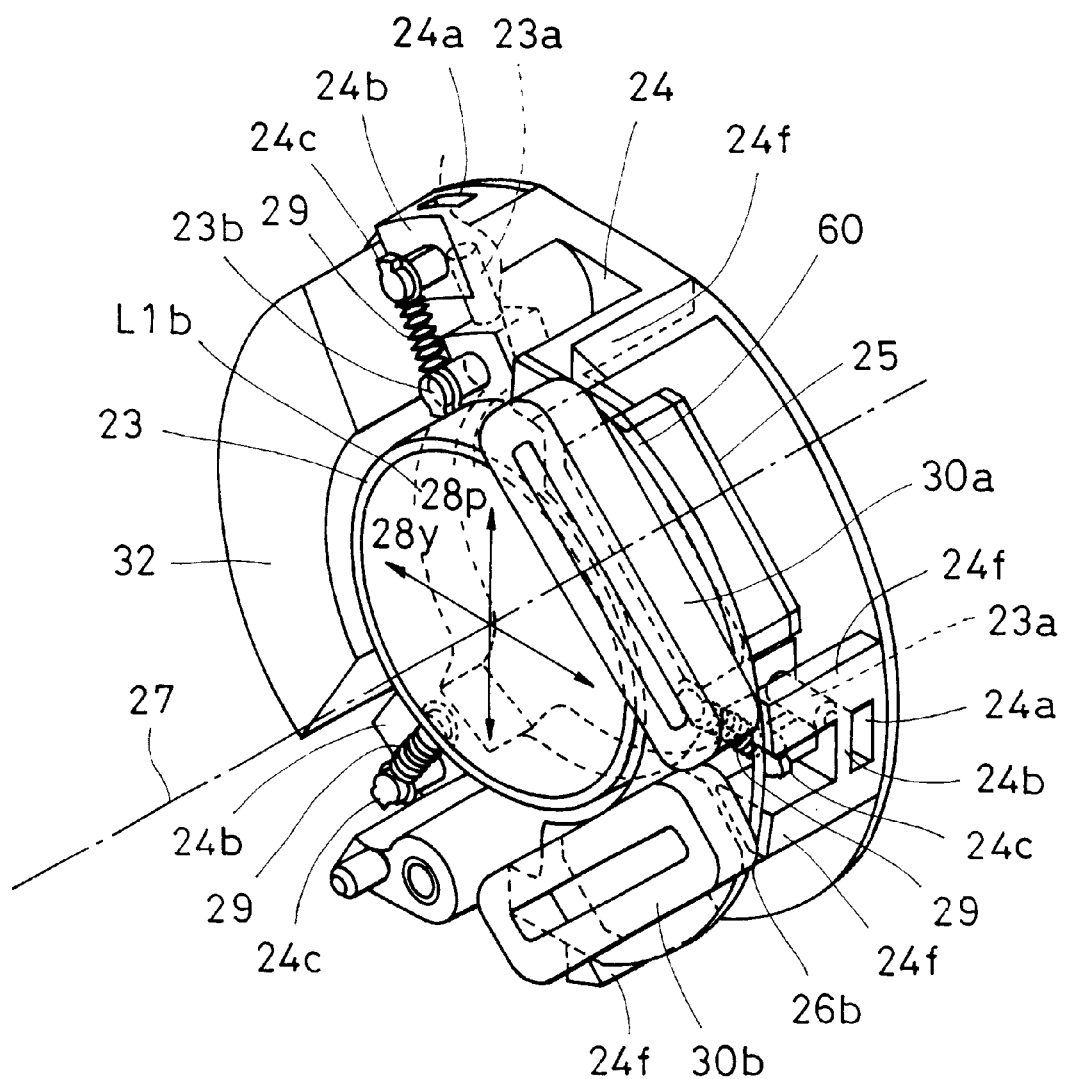
FIG. 5 is a perspective view of the shake correcting apparatus according to a first embodiment of the present invention.
Figure 6:
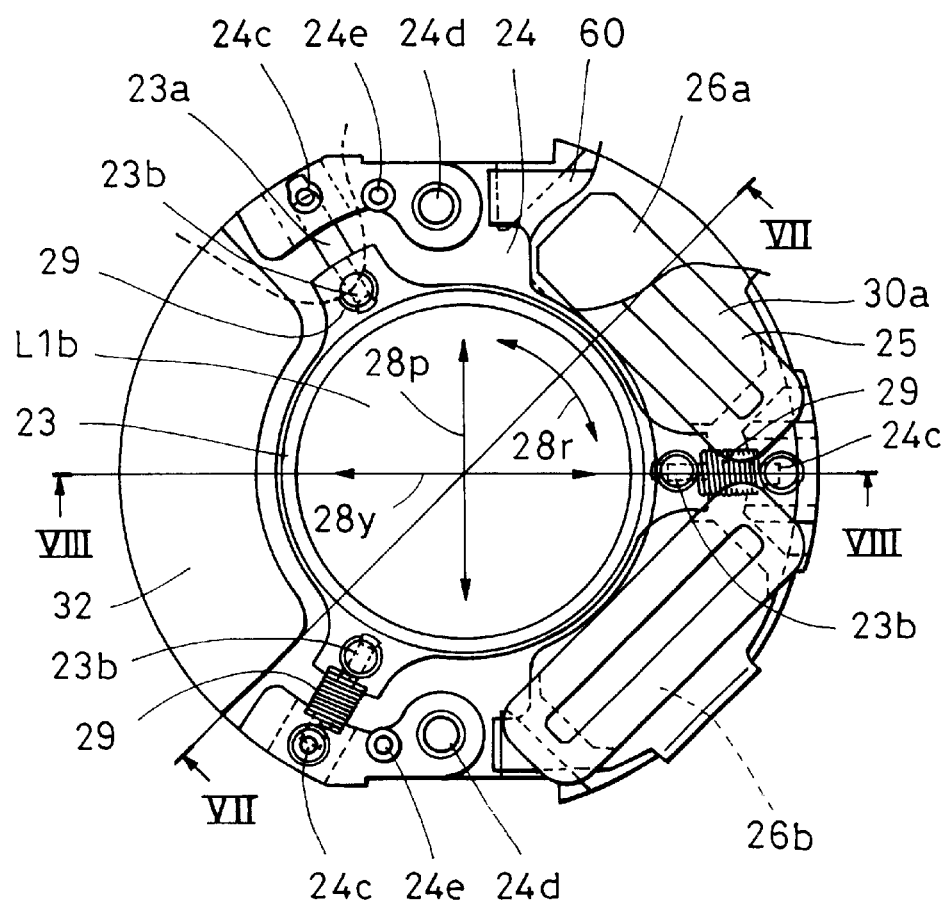
FIG. 6 is a front view of the shake correcting apparatus shown in FIG. 5.
Figure 7:
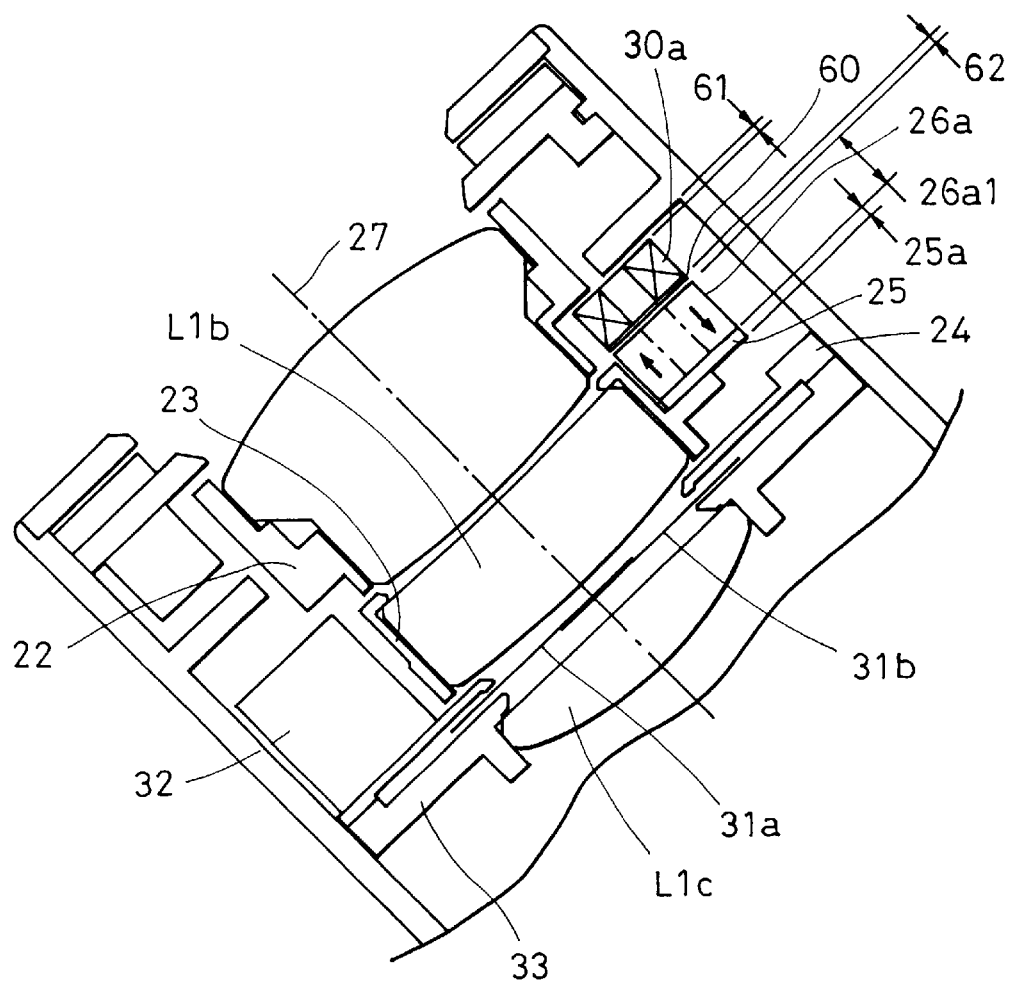
FIG. 7 is a sectional view at the line VII—VII of FIG. 6.
Figure 8:
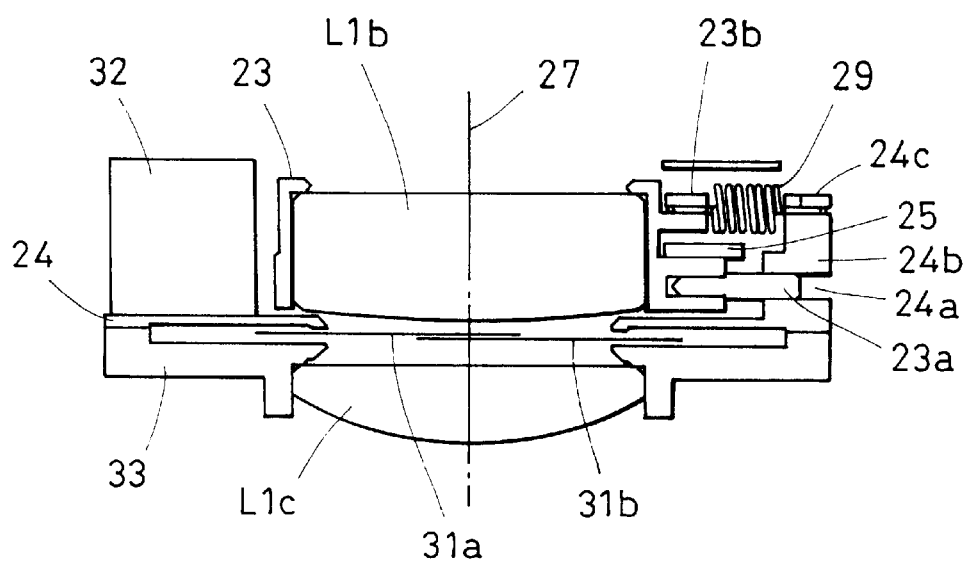
FIG. 8 is a sectional view at the line VIII—VIII of FIG. 6.

FIG. 1 is an exterior view of a compact camera having a shake correcting apparatus according to a first embodiment of the present invention; FIG. 2 is a transverse sectional view at the position indicated by the horizontal phantom line in FIG. 1 when a photographic system is in a wide angle view mode; FIG. 3 is a longitudinal sectional view at the position indicated by the vertical phantom line in FIG. 1 when the photographic system is in a telescopic mode; and FIG. 4 is a perspective view showing an interior structure of the shake correcting apparatus and related portions thereof which are equipped in the camera shown in FIG. 1. FIGS. 5 to 8 are drawings showing the shake correcting apparatus according to the first embodiment of the present invention in detail: specifically, FIG. 5 is a perspective view of the shake correcting apparatus; FIG. 6 is a front view of the shake correcting apparatus; FIG. 7 is a sectional view at the line VII—VII of FIG. 6; and FIG. 8 is a sectional view at the line VIII—VIII of FIG. 6. In addition, in each sectional view mentioned above, hatching is omitted for clarifying the drawings.

FIGS. 2 and 3 show a camera body 1, a cover 2 attached to the camera body 1, and a fixed cylinder 3 attached to the camera body 1 and having a female helicoid 3a and a linear groove 3b in the internal periphery thereof. A driving unit 4 is attached to the fixed cylinder 3. A first differential cylinder 5 has a helicoidal portion 5a rotatably and movably engaged with the female helicoid 3a of the fixed cylinder 3, a spur gear 5b meshed with the driving unit 4, a bayonet groove 5c, and a driving key way 5d. A first advancing cylinder 6 has an advancing key 6a engaged with the linear groove 3b movably in an optical axial direction and a bayonet key 6b engaged with the bayonet groove 5c in the external periphery thereof, and also has a female helicoid 6c and a linear groove 6d in the internal periphery thereof. The first advancing cylinder 6 is rotatable about the first differential cylinder 5 and advances back and forth in the optical axial direction in unison with the first differential cylinder 5. In addition, the first differential cylinder 5 is rotated by the driving unit 4 so as to move back and forth in the optical axial direction together with the first advancing cylinder 6.

A ghost-cut plate 7 is attached to the first advancing cylinder 6. A second differential cylinder 8 has a male helicoid 8a rotatably and movably engaged with the female helicoid 6c and a driving pin 9 in the external periphery thereof and also has a female helicoid 8b, a cam groove 8c, and a driving ring 10 attached by the driving pin 9 in the internal periphery thereof. The driving pin 9 is movably engaged with the driving key way 5d so as to rotate and move the second differential cylinder 8 in the optical axial direction in phase with the rotation of the first differential cylinder 5 as the first differential cylinder 5 rotates. An advancing key ring 11 has an advancing key 11a movably engaged with the linear groove 6d in the optical axial direction and two linear guide keys 11b extending in the optical axial direction in the external periphery thereof. By rotatably pinching the driving ring 10 and attaching a linear key nut 12 to the advancing key ring 11 with a screw 13, the advancing key ring 11 moves in the optical axial direction as the second differential cylinder 8 rotates and moves in the optical axial direction.

A first lens group lens barrel 14 having a male helicoid 14a rotatably and movably engaged with the female helicoid 8b in the external periphery thereof moves in the optical axial direction as the movement thereof is restricted by the linear guide key 11b fitted into a key way 14b so as to be linearly moved. A second lens group lens holder 15 for holding a second lens group and having a pin 15a fitted into the cam groove 8c moves in the optical axial direction as a key 15b is fitted to the linear guide key 11b.

The first lens group lens barrel 14 and the second lens group lens holder 15 are moved in the optical axial direction without rotating due to the rotation of the second differential cylinder 8.

A first lens group unit 20, which is attached to the first lens group lens barrel 14 with screws 21, and comprises lenses L1a to L1c and lens holding structure from L1a lens holder 22 to a diaphragm retainer plate 33, is moved in the optical axial direction. The image pick-up system group is formed of the first lens group lens L1a attached to a bottom board 24, the correction lens L1b fixed to a supporting frame 23, the first lens group lens L1c fixed to the diaphragm retainer plate 33, and the second lens group lens L2.

As shown in FIGS. 5 to 7, to the supporting frame 23, a yoke 25 is attached, which is formed of a ferromagnetic material and having permanent magnets 26a and 26b formed of neodymium, etc., stuck and fixed on the surface of the yoke 25. As shown in FIG. 7, the yoke 25 also serves as an adjusting member for adjusting the size of an air gap 62 between the permanent magnet 26a and a coil 30a so as to be constant from one apparatus to another apparatus during manufacturing. That is, any error in the thickness 26a1 is compensated for so that the size of the air gap 62 is maintained constant by changing the thickness 25a of the yoke 25. The same structure and arrangement also are provided for permanent magnet 26b and coil 30b.

Three pins 23a (see FIG. 6) radially extending from the supporting frame 23 at substantially equal intervals are fitted into elongated holes 24a formed on side walls 24b of the bottom board 24. As shown in FIGS. 5 and 6, the relationship between the pin 23a and the elongated hole 24a is that there is no play in the optical axial direction of the correction lens L1B due to fitting, and the elongated hole 24a is extending in a direction orthogonal to the optical axis, so that although movement of the supporting frame 23 is restricted in the direction of the optical axis 27 relative to the bottom board 24, the supporting frame 23 can freely move in a plane orthogonal to the optical axis (arrows 28p, 28y, and 28r). However, since between hooks 23b on the supporting frame 23 and hooks 24c on the bottom board 24, tension springs 29 are respectively stretched, the movement is elastically restricted in each of these directions (28p, 28y, and 28r).

FIGS. 5 to 7 show a damper board 60 formed of a known conductive and non-magnetic material and a coil 30a attached to the damper board 60, which together form a coil unit. As publicly known, when the permanent magnet 26a is vibrated due to a vibration applied to a camera, the damper board 60 generates an eddy current so as to produce magnetic friction between the permanent magnet 26a and the damper board 60, enabling the damper board 60 to have an effect (a damping effect) suppressing the vibration of the permanent magnet 26a (and thereby the correction lens L1b). Furthermore, the coil 30a opposes the permanent magnet 26a, and a space 61 for absorbing variation of the thickness of the coil 30a is arranged on a side opposite the surface opposing the permanent magnet 26a, so that the external periphery of the damper board 60 is fixed to coil-fixing bases 24f of the bottom board 24. The same structure and arrangement also are provided for permanent magnet 26b and coil 30b.

Permanent magnet 26a and coil 30a are attached to the bottom board 24 via the damper board 60, so that the size of air gap 62 between the permanent magnet 26a and the coil 30a is controlled by the damper board 60. Even when the thickness of the coil 30a varies from one apparatus to another apparatus, since the variation in the thickness is absorbed into space 61 at the side of the damper board 60 opposite the side of coil 30a, the air gap 62 between the permanent magnet 26a and the coil 30a is not changed, enabling the variation of the driving force from one apparatus to another apparatus to be suppressed. The same structure, arrangement, and function are provided for permanent magnet 26b and coil 30b.

An arrangement of the yoke 25, the permanent magnet 26a, and the coil 30a is as shown in FIG. 7 and forms electromagnetic driving means for driving the correction lens L1b. The same arrangement also is provided for permanent magnet 26b and coil 30b.

When currents are passed through coil 30a and coil 30b in the same direction, the supporting frame 23 is driven in the direction of the arrow 28y, while when currents are respectively passed through coil 30a and coil 30b in directions opposite each other, the supporting frame 23 is driven in the direction of arrow 28p. The amount of driving is obtained by the balance between the spring constant of each tension spring 29 in each direction and a thrust force produced due to the relationship between the coils 30a and 30b and the permanent magnets 26a and 26b. That is, by controlling the current strength passed through the coils 30a and 30b, the amount of deviation of the correction lens L1b can be controlled.

As shown in FIG. 8, shutter blades 31a and 31b attached to the bottom board 24 are opened and closed by a shutter driving device 32 (see FIGS. 5 to 8) comprising a known permanent magnet and a coil and disposed at a position having a different phase from the electromagnetic driving means formed of the yoke 25, the permanent magnet 26 (26a and 26b), and the coil 30 (30a and 30b) about the optical axis 27.

The diaphragm retainer plate 33 is attached to the bottom board 24 (see FIG. 7), and the lens L1c is attached to the diaphragm retainer plate 33. Positioning pins 24e of the bottom board 24 (see FIG. 6) are inserted into positioning holes of the first group lens barrel 14, and the entire first lens group unit is attached to the first lens group lens barrel 14 with screws 21 to be screwed into tapped holes 24d (see FIG. 6). Attached to the first lens group lens barrel 14 are a known barrier driving mechanism 34, a barrier bottom board 35, barrier blades 36a and 36b, and a barrier cover 37, which are shown in FIG. 2.

FIG. 2 shows a pressure plate 38 supporting a film relative to the camera body 1 and a film cartridge 39 to be accommodated in a cartridge chamber 1a of the camera body 1. A film 40 is accommodated in the film cartridge 39 and rolled onto a spool 43 by feeding means including a feeder (not shown) driven by a feeder motor 41.

In the above embodiment, a shake correcting apparatus is formed of the components from the supporting frame 23 to the coil 30 and the damper board 60 as principal constituent parts.

In the camera formed as described above, a pitching shake and a rolling shake of the camera indicated by the arrows 44p and 44y about the optical axis 44 in FIG. 1 (equivalent to the optical axis 27) can be corrected. That is, correction of shake in directions of arrows 28*p* and 28*y* shown in FIG. 4 is performed by driving the correction lens L1*b* in directions of arrows 28*p* and 28*y*.

In addition, as shown in FIG. 1, a release button 2*a*, a mode dial 2*b* (including a main switch), a stroboscope 2*c*, and a viewfinder window 2*d* are attached to the cover 2.

FIG. 4 shows vibration detecting devices 45*p* and 45*y* such as angular velocity meters and angular acceleration meters for respectively detecting shake in directions indicated by arrows 46*p* and 46*y*. Outputs of the vibration detecting devices 45*p* and 45*y* are converted into driving target values of a shake correcting apparatus 70, which is the correction lens L1*b* in detail formed of components shown in FIGS. 5 to 8, via computing units 47*p* and 47*y*, which will be described later, so as to be input in coils of electromagnetic driving means for driving the correction lens L1*b*, thereby performing shake correction.

Figure 9:
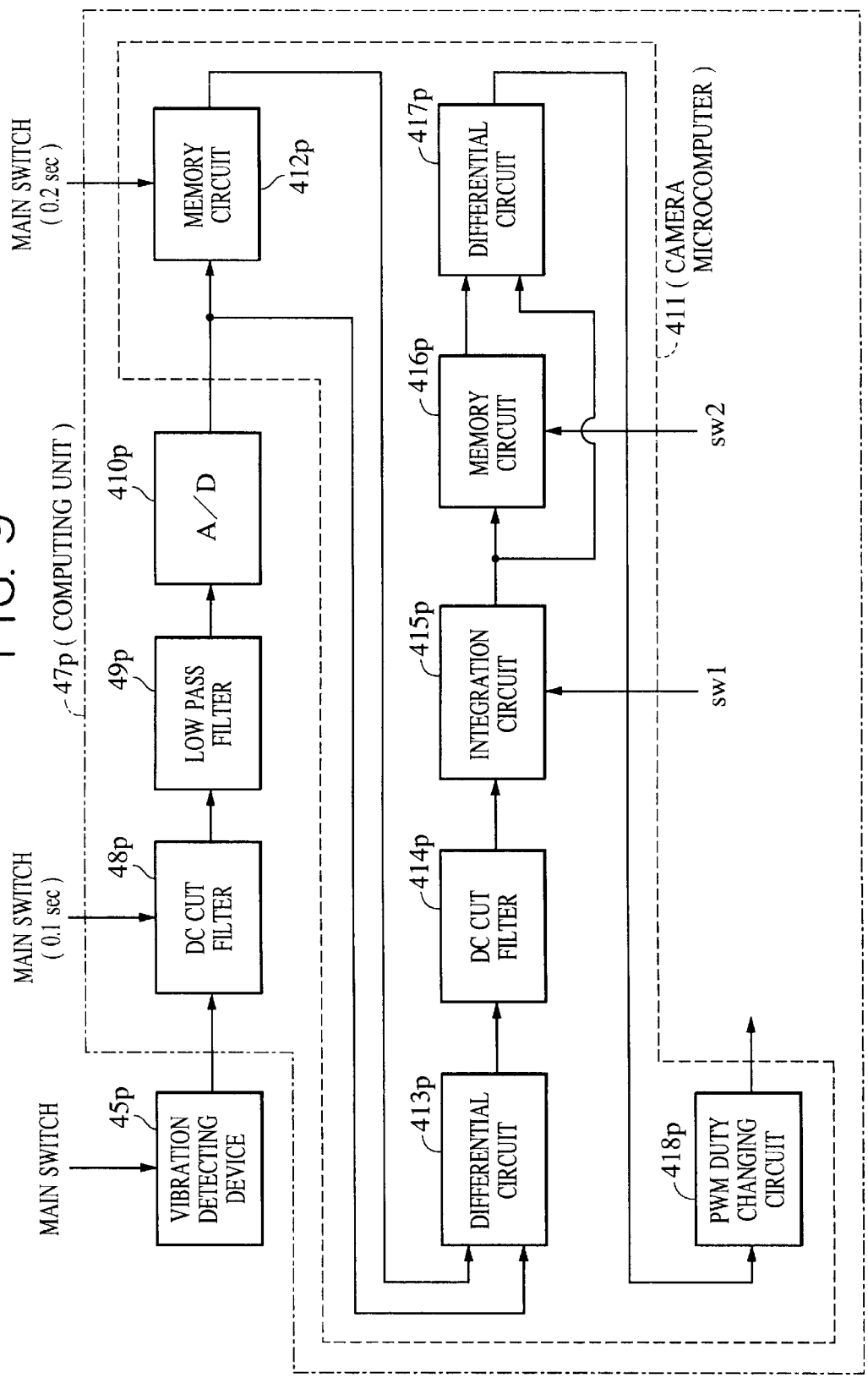
FIG. 9 is a block diagram showing configurations of a vibration detecting device and a computing unit shown in FIG. 4.

FIG. 9 is a block diagram showing details of the computing units 47*p* and 47*y* shown in FIG. 4. Since these units have the same structure, the structure will be described with reference to FIG. 9 showing only computing unit 47*p*.

Computing unit 47*p* is formed of a DC cut filter 48*p*, a low pass filter 49*p*, an A/D converter 410*p*, and constituent components in a camera microcomputer 411 which are a memory circuit 412*p*, a differential circuit 413*p*, a DC cut filter 414*p*, an integration circuit 415*p*, a memory circuit 416*p*, a differential circuit 417*p*, and a PWM duty changing circuit 418*p*, all of which are indicated by surrounding with an alternate long and short dash line in FIG. 9.

In the embodiment, as the vibration detecting device 45*p*, a vibration gyroscope for detecting an angular velocity of a camera-shake is used, which is driven in synchronization with switching-on of a main switch of the camera so as to start the detection of a shake angular velocity applied to the camera.

From the signal of the vibration detecting device 45*p*, a DC biased component superimposed on the signal is cut by the DC cut filter 48*p* formed of an analogous circuit. The DC cut filter 48*p* has frequency characteristics that signal frequencies of 0.1 Hz or less are cut so as not to have an effect on a shake frequency band of 1 to 10 Hz applied to the camera. However, in such characteristics that cut signal frequencies of 0.1 Hz or less, there is a problem that complete cutting of DC after inputting of a shake signal from the vibration detecting device 45*p* requires nearly ten seconds.

Therefore, from switching-on of the camera main switch through 0.1 sec, for example, a time constant of the DC cut filter 48*p* is reduced (for example, to have characteristics that signal frequencies of 10 Hz or less are cut) so as to cut DC within a short time of 0.1 sec, and then the time constant is increased (to have characteristics that only signal frequencies of 0.1 Hz or less are cut) so as not to deteriorate the shake angular velocity signal due to the DC cut filter 48*p*.

The output of the DC cut filter 48*p* is properly amplified by the low pass filter 49*p* formed of an analogous circuit according to a resolving power of A/D conversion, while high frequency noise superimposed on the shake angular velocity signal is thereby cut. This is for avoiding misjudgment of the shake angular velocity signal due to sampling of the A/D converter 410*p* when the shake angular velocity signal is input into a microcomputer of the camera.

The signal of the low pass filter 49*p* is input into the camera microcomputer 411 by sampling of the A/D converter 410*p*.

The DC biased component has been cut by the DC cut filter 48*p*; however, the DC biased component is again superimposed on the shake angular velocity signal due to amplification by the low pass filter 49*p*, so that DC cutting is required to be again performed in the camera microcomputer 411.

Therefore, the shake angular velocity signal sampled at the time 0.2 sec after switching-on of the camera main switch, for example, is stored in memory circuit 412*p*, so that the difference between the stored value and the shake angular velocity signal is obtained by differential circuit 413*p* so as to cut DC.

In addition, since this operation only can roughly cut DC (because in the shake angular velocity signal stored at the time 0.2 sec after switching-on of the main switch, not only DC components but also actual camera-shake are included), in the latter stage, the DC cutting is thoroughly performed by the DC cut filter 414*p* formed of a digital filter. The time constant of the DC cut filter 414*p* is also variable just like the analogous DC cut filter 48*p*, so that the time constant is gradually increased by spending 0.2 sec from the time 0.2 sec after switching-on of the camera main switch.

Specifically, the DC cut filter 414*p* has filter characteristics that cut frequencies of 10 Hz or less at the time 0.2 sec after main-switch-on; then frequencies cut by the filter are reduced to 5 Hz or less, 1 Hz or less, 0.5 Hz or less, and 0.2 Hz or less every 50 msec thereafter. However, when a photographer performs a half-push of the release button 2*a* shown in FIG. 1 (sw1 "on") so as to perform operation for measurement of light intensity and the object distance, there may be an undesirable case in spending a time for changing the time constant because image pick-up is possible to be immediately performed.

In such occasions, changing of the time constant is stopped in the middle according to image pick-up conditions. For example, when the shutter speed is to be 1/60 sec from the result of the light-intensity measurement and the focal distance is 150 mm, the changing of the time constant is completed at the time that the DC cut filter 414*p* cuts frequencies of 0.5 Hz or less because the vibration proof accuracy is not so required at the conditions (the amount of time constant change is controlled by the product of the shutter speed and the focal distance). Thereby, the time for time constant change is reduced and shutter chance can have priority. Of course, at a higher shutter speed or a shorter focal distance, the changing of the time constant is completed at the time that the DC cut filter 414*p* cuts frequencies of 1 Hz or less, while at a lower shutter speed or a longer focal distance, image pick-up is prohibited until the changing of the time constant is finally completed.

The integration circuit 415*p* starts to integrate the signal of the DC cut filter 414*p* upon performing a half-push of the release button 2*a* (sw1 "on") so as to convert the angular velocity signal into an angular signal. However, as described above, when the time constant changing of the DC cut filter 414*p* is not completed, the integration is not performed until such completion.

In addition, although omitted in FIG. 9 for simplicity, the integrated angular signal is properly amplified according to current information at the time about the focal distance and the distance to an object so as to be converted so that appropriate quantity correcting means is driven according to the shake angle (since the image pick-up optical system is changed due to zoom focusing so that the amount of optical axial deviation is changed relative to the amount of driving of the correcting means, this correction is needed).

Upon performing a full-push operation of the release button 2*a* (sw2 "on"), the shake correcting apparatus 70 is started, that is, driving of correction lens L1b is started according to the shake angular signal; at this time, caution should be taken not to suddenly start a shake correcting operation of the correction lens L1b. The memory circuit 416p and the differential circuit 417p are arranged for this purpose. The memory circuit 416p stores the shake angular signal of the integration circuit 415p in synchronization with performing a full-push operation of the release button 2a (sw2 "on"). The differential circuit 417p obtains the difference between the signal of the integration circuit 415p and the signal of the memory circuit 416p. Therefore, two signals input to the differential circuit 417p are the same at the time sw2 is turned on and the target signal of the differential circuit 417p for driving the correction lens L1b is zero, then the output is performed continuously from zero (the memory circuit 416p serves to make the integrated signal at the time sw2 is turned to be the origin). The correction lens L1b is thereby not driven suddenly.

The target signal from the differential circuit 417p is input into the PWM duty changing circuit 418p. When a voltage or a current corresponding to the shake angle is applied across or through the coil of the electromagnetic driving means, the correction lens L1b is driven according to the shake angle, and PWM driving is preferable for energy saving of driving the correction lens L1b and the driving transistor of the coil. Therefore, the PWM duty changing circuit 418p changes the coil driving duty according to the target value. For example, in PWM with a frequency of 20 KHz, at a target value of "2048" in the differential circuit 417p, the duty is to be zero, while at a target value of "4096", the duty is to be 100; duties therebetween are divided at equal intervals to be determined according to the target values. In addition, the determination of the duty is controlled not only by the target value but also by image pick-up conditions of a camera (temperature, a camera posture, and battery conditions) so that shake correction with high accuracy can be performed by fine control.

The output of the PWM duty changing circuit 418p is input into known means such as a PWM driver, so that the output therefrom is applied to the coil 30 in the electromagnetic driving means so as to perform shake correction. The electromagnetic driving means is driven in synchronization with turning sw2 on and is driving stopped upon completion of film exposure to light.

Even when the exposure is completed, as long as the release button 2a remains in a half-pushed position (sw1 "on"), the integration circuit 415p continues integration; at the next sw2-on, the memory circuit 416p again stores the memory of a new integrated output. When the half-push operation of the release button 2a is cancelled, the integration circuit 415p stops the integration of the output of the DC cut filter 54p and resets the integrating means. The resetting means cancels the entire information ever integrated.

At the time of main-switch-off, the vibration detecting device 45p is stopped so as to finish a vibration sequence.

In addition, when the signal of the integration circuit 415p is increased so as to be larger than a predetermined value, it is determined that camera panning is being performed, so that the time constant of the DC cut filter 414p is changed. For example, characteristics that cut frequencies of 0.2 Hz or less are changed to characteristics that cut frequencies of 1 Hz or less; then the time constant is again returned to the original time constant after a predetermined time. At this time, the amount of the time constant change is also controlled according to the amount of the output of the integration circuit 415p. That is, when the output exceeds a first threshold value, the characteristics of the DC cut filter cut frequencies of 0.5 Hz or less; when the output exceeds a second threshold value, the characteristics cut of the DC filter frequencies of 1 Hz or less; when the output exceeds a third threshold value, the characteristics of the DC filter cut frequencies of 5 Hz or less.

When the output of the integration circuit 415p is extremely increased, the integration circuit 415p is once reset so as to prevent saturation (overflow) in computation.

In the above described embodiment of FIG. 9, the DC cut filter 414p is to be started at the time 0.2 sec after main-switch-on; however, it is not limited thereto and it may be started upon performing a half-push of the release button 2a (SW1 "on"). In this case, the integration circuit 415p is started upon completion of the time constant change of the DC cut filter 414p.

Also, the integration circuit 415p is to be started upon performing a half-push of the release button 2a; however, it may be started upon performing a full-push operation (sw2 "on") of the release button 2a. In this case, the memory circuit 416p and the differential circuit 417p are not necessary.

In the above described embodiment of FIG. 9, the DC cut filter 48p and the low pass filter 49p are arranged in the computing unit 47p; however, these components may be of course arranged in the vibration detecting device 45p.

According to the first embodiment described above, in a camera having a correcting function that an image shake is corrected by driving a correcting system (correction lens in the illustrated embodiment, and an image pick-up element may be displaced), as shown in FIG. 7, an adjusting member for holding constant the size of an air gap between the permanent magnet 26 and the coil 30, which are the electromagnetic driving means, is attached to at least one of the permanent magnet 26 and the coil 30 (the permanent magnet in the illustrated embodiment), thereby stabilizing the driving force.

Also, the yoke 25 may serve as the above-mentioned adjusting board as well, so that the shake correcting apparatus can be miniaturized.

As shown in FIG. 7, a space 61 for absorbing thickness variation in the coil unit including the coil 30 or in the permanent magnet 26 is provided on at least one of two respective sides opposite the opposing surfaces between the coil 30 and the permanent magnet 26 (the coil in the embodiment), so that even when the thickness of the permanent magnet 26 or the coil unit including the coil 30 varies from one apparatus to another apparatus during manufacturing, the air gap between the coil 30 and the permanent magnet 26 is fixed, thereby reducing variations in the driving force.

In the structure described above, the coil 30 is attached to the bottom board 24 via the damper board 60 by restricting the position thereof with the external periphery of the coil unit, facilitating attachment of the coil 30 to the bottom board 24.

Furthermore, since the damper board 60 is a nonmagnetic and conductive member, it can have a damping effect on the correcting system. Also, the damper board 60 controls the size of the gap between the permanent magnet 26 and the coil 30, enabling the apparatus to be miniaturized and improving the reliability of the apparatus.

(Second Embodiment)

Figure 10:
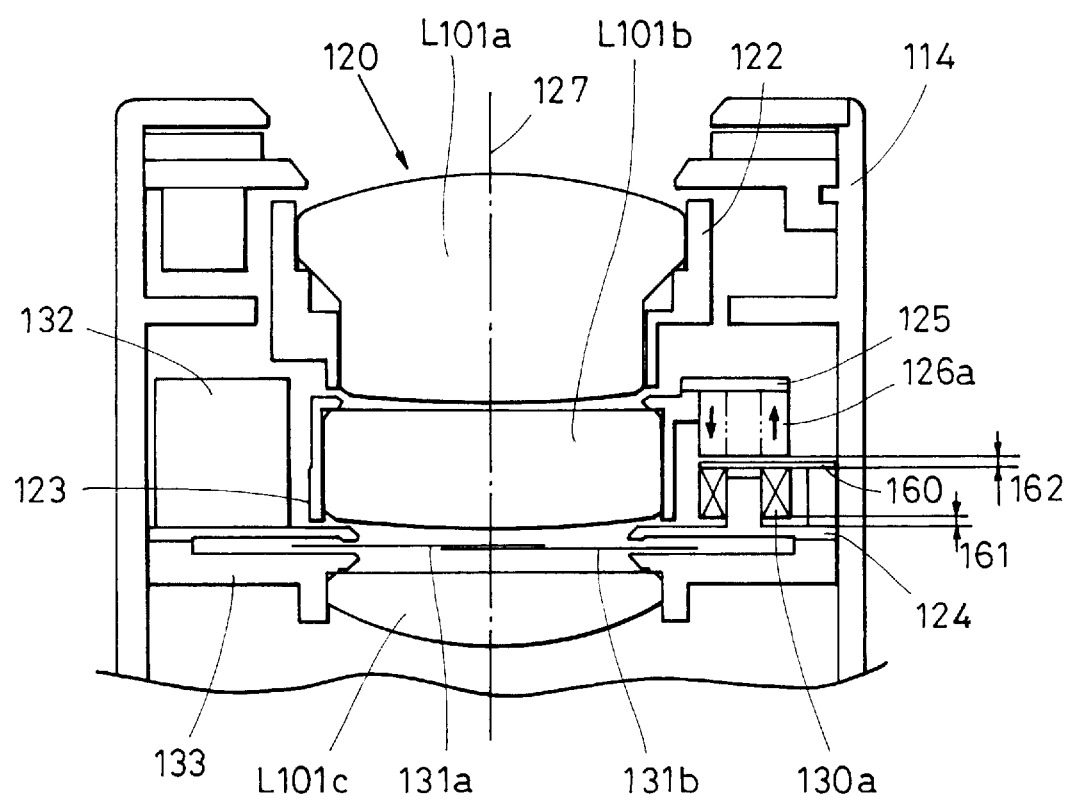
FIG. 10 is a sectional view showing a configuration of the principal part of a camera having a shake correcting apparatus according to a second embodiment of the present invention.

FIG. 10 is a sectional view showing a configuration of the principal part of a camera having a shake correcting apparatus according to a second embodiment of the present invention. This drawing corresponds to FIG. 7 according to the first embodiment described above. The configuration and operation of the camera elements other than those in FIG. 10 are the same as the first embodiment and the description thereof is omitted.

In FIG. 10, an image pick-up optical system group is formed of a first lens group lens L101a supported by an L101a lens holder 122 and attached to a bottom board 124, a correction lens L101b fixed to a supporting frame 123, a first lens group lens L101c fixed to the bottom board 124, and a second lens held by a second lens group holder (not shown).

A first lens group unit 120 attached to a first lens group lens barrel 114 is formed of components from the L101a lens holder 122 to a coil 130 (130a and 130b), a damper board 160, and first lens group lenses L101a to L101c, and advances in an optical axial direction. The components from the supporting frame 123 to the coil 130 and the damper board 160 form a principal part of a shake correcting apparatus just like in the first embodiment described above. In addition, the coil 130 may be a coil unit formed of the coil 130 and a holding member (not shown) for unitarily holding the coil 130.

A yoke 125, a permanent magnet 126a, and the coil 130a are arranged as shown in FIG. 10 and form electromagnetic driving means just like in the first embodiment described above. In addition, a corresponding permanent magnet 126b and coil 130b (not shown in FIG. 10) have the same arrangement as above.

The damper board 160 is formed of a known conductive and non-magnetic material, and the coil 130a is attached to the damper board 160. Furthermore, a space 161 for absorbing variation in the thickness of the coil 130a is arranged between the permanent magnet 126a and the bottom board 124 on a side opposite the surface opposing the permanent magnet 126a so that the coil 130a opposes the permanent magnet 126a, and the damper board 160 is fixed to a coil-fixing base (not shown) of the bottom board 124 (see first embodiment). The same structure and arrangement are provided for the permanent magnet 126b and coil 130b.

Even when the thickness of the coil 130a varies from one apparatus to another apparatus during manufacturing, since the variation in the thickness is thereby absorbed into the space 161 in the side opposite the damper board 160 of the coil 130a, the size of an air gap 162 between the permanent magnet 126a including the thickness of the nonmagnetic damper board 160 and the coil 130a is not changed, enabling the variations in the driving force to be suppressed.

Shutter blades 131a and 131b are attached to the bottom board 124 and are opened and closed by a shutter driving device 132 comprising a known permanent magnet and a coil and disposed at a position having a different phase from the electromagnetic driving means formed of the yoke 125, the permanent magnet 126, and the coil 130 about an optical axis 127. A diaphragm retainer plate 133 is attached to the bottom board 124, and the lens L101c is attached to the diaphragm retainer plate 133.

The first lens group unit 120 formed of these components is attached to a first lens group lens barrel 114.

A camera having the shake correcting apparatus formed as above performs shake correction of a pitching shake and a rolling shake of the camera by using a vibration detecting device such as a known angular velocity meter and an angular acceleration meter and the computing unit shown in FIG. 9 just like in the first embodiment described above.

According to the second embodiment described above, in a camera having a correcting function that an image shake is corrected by driving a correcting system, a space for absorbing thickness variation of the coil 130 is provided on a side opposite an opposing surface between the coil 130 and the permanent magnet 126, so that even when the thickness of the coil 130 varies from one apparatus to another apparatus during manufacturing, the size of the air gap between the coil 130 and the permanent magnet 126 is fixed, thereby reducing variations in the driving force.

In the structure described above, the coil 130 is attached to the bottom board 124 via the damper board 160, so that the coil 130 can be easily attached to the bottom board 124.

Furthermore, since the damper board 160 is a nonmagnetic and conductive member, it can have a damping effect on the correcting system. Also, the damper board 160 controls the side of the gap between the permanent magnet 126 and the coil 130, enabling the apparatus to be miniaturized and improving the reliability of the apparatus.

(Third Embodiment)

Figure 11:
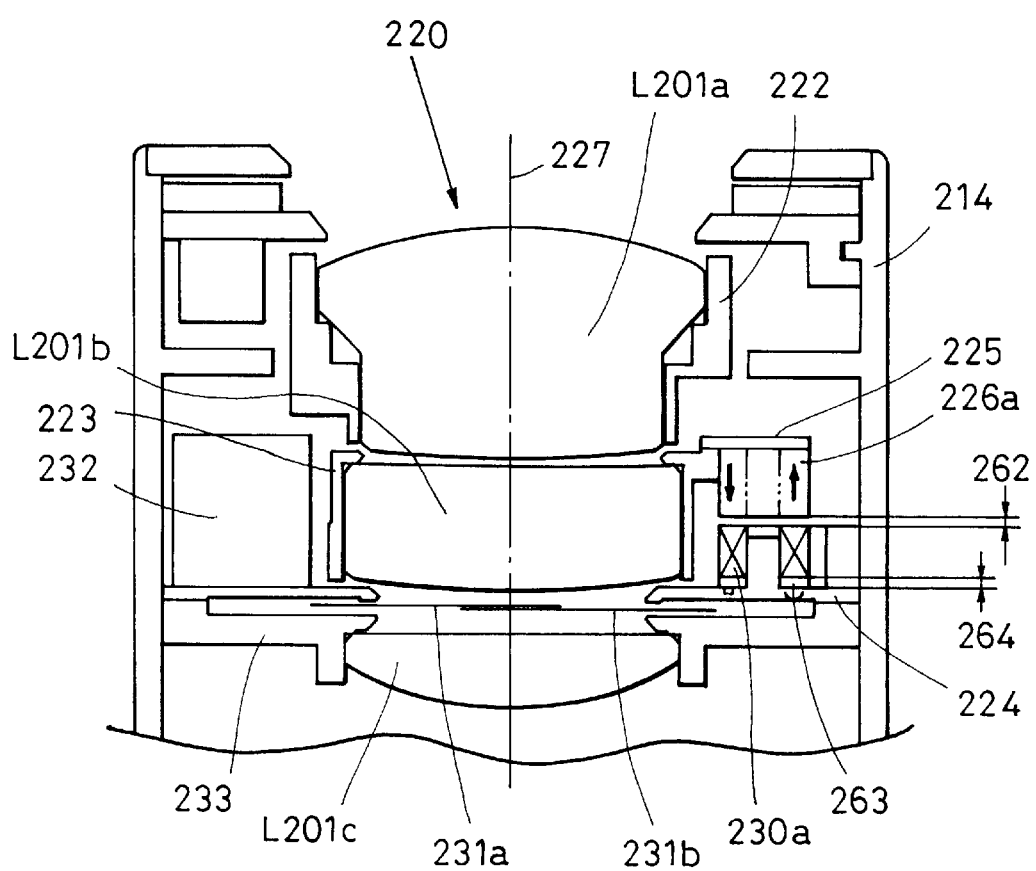
FIG. 11 is a sectional view showing a configuration of the principal part of a camera having a shake correcting apparatus according to a third embodiment of the present invention.
Figure 12:
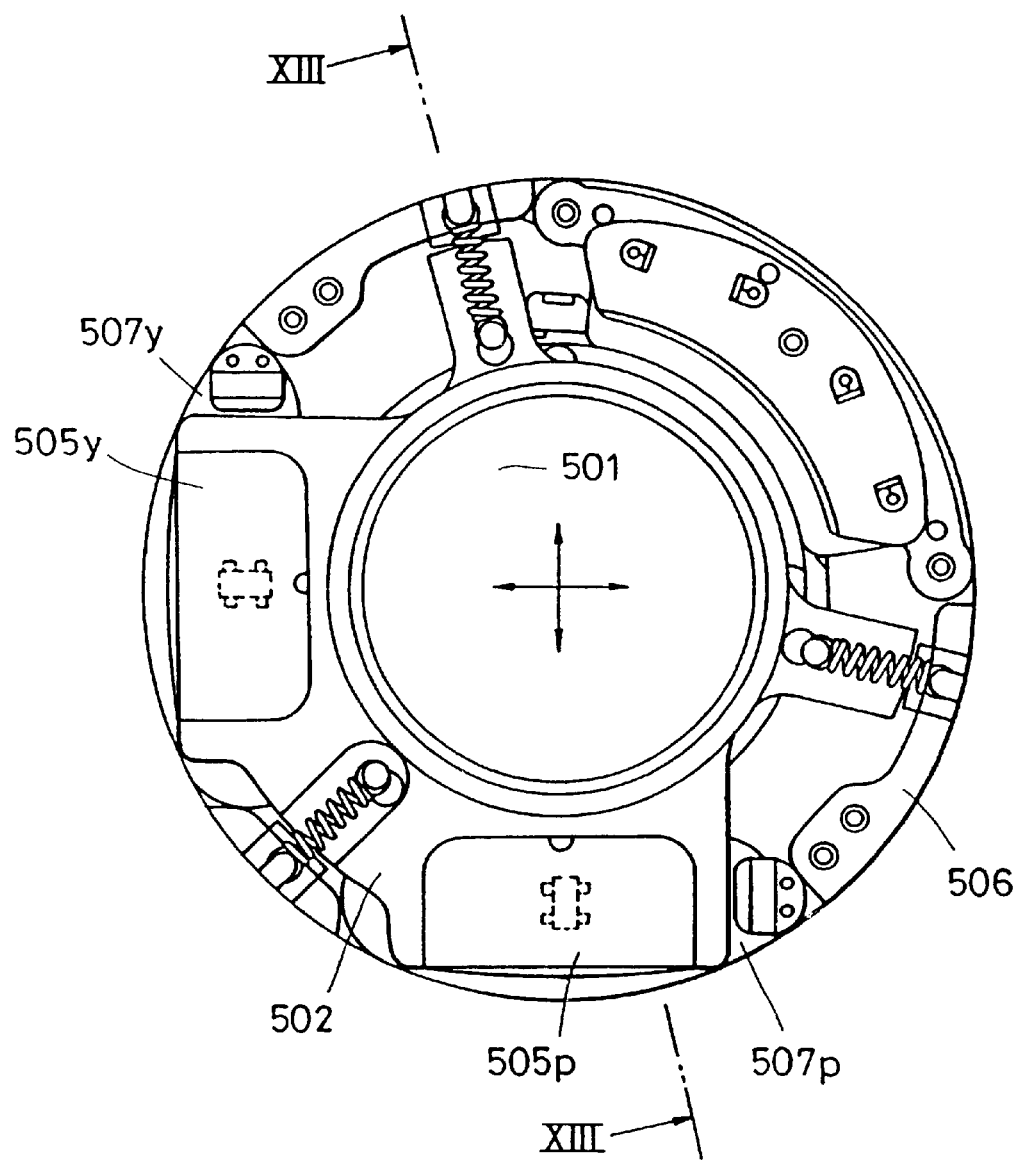
FIG. 12 is a front view showing a first example of a conventional shake correcting apparatus.
Figure 13:
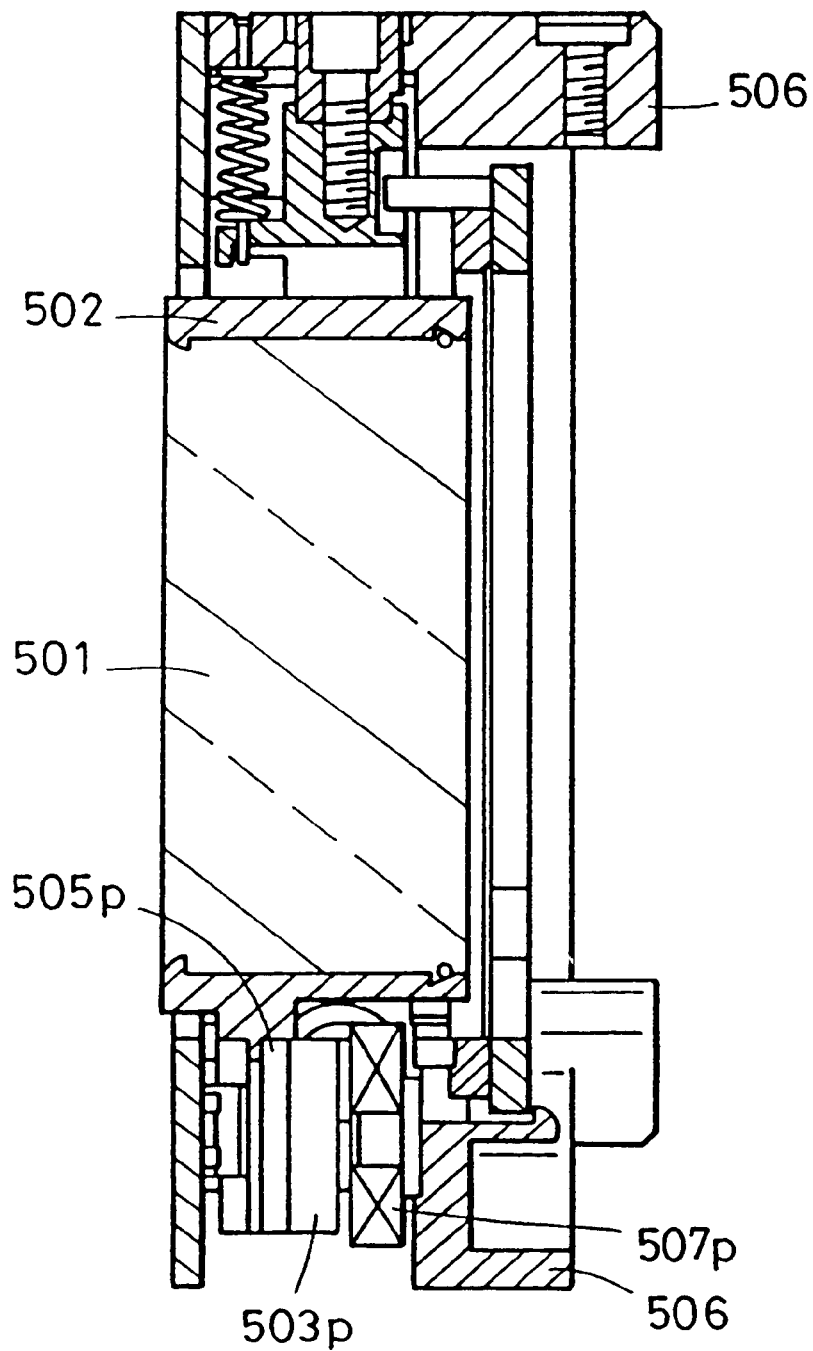
FIG. 13 is a sectional view at the line XIII—XIII of FIG. 12.
Figure 14A:
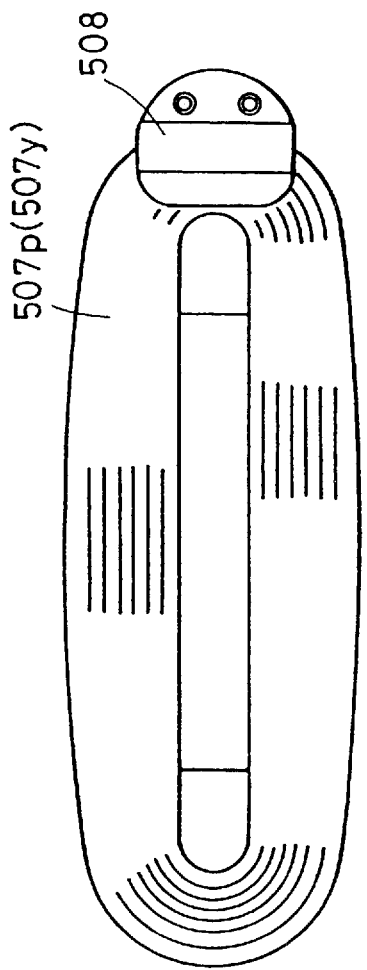
FIGS. 14A to 14C are views showing a principal part of a second example of a conventional shake correcting apparatus.
Figure 14B:
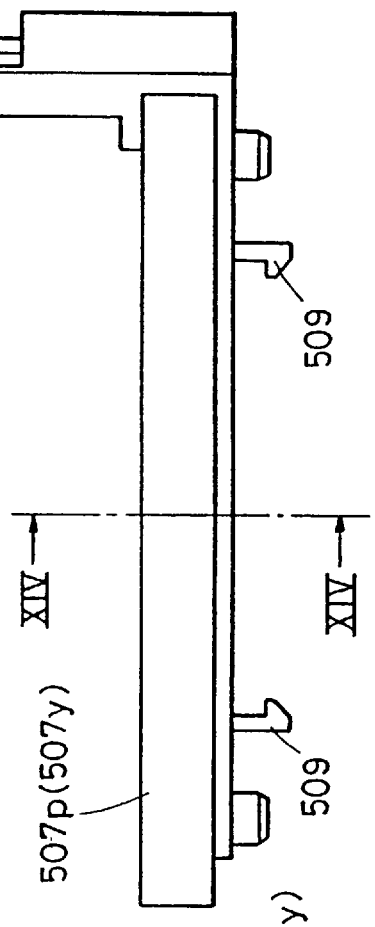
Figure 14C:
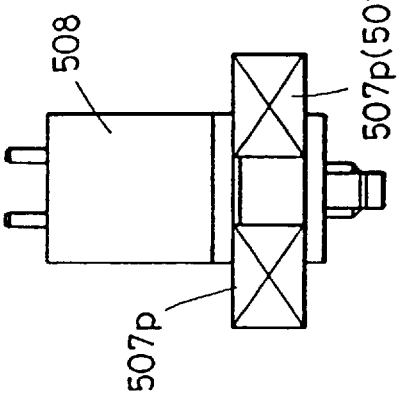
Figure 15:
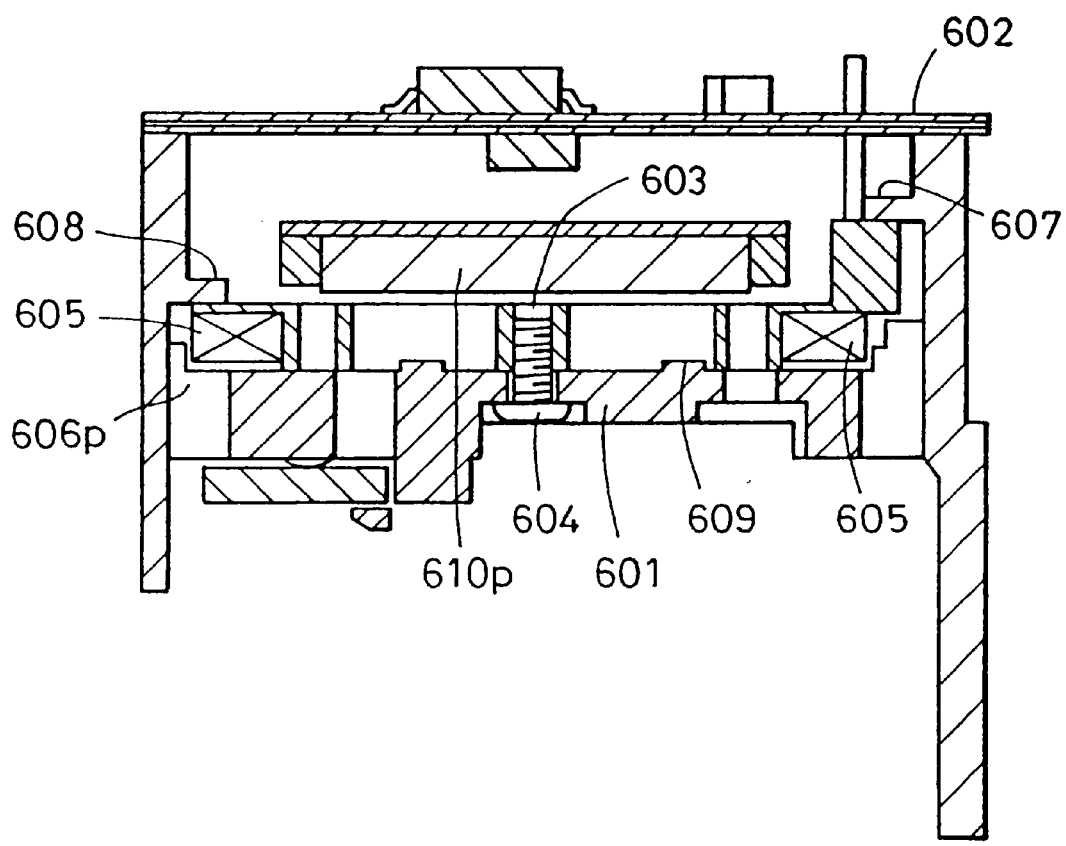
FIG. 15 is a front view showing a third example a principal part of a conventional shake correcting apparatus.
Figure 16:
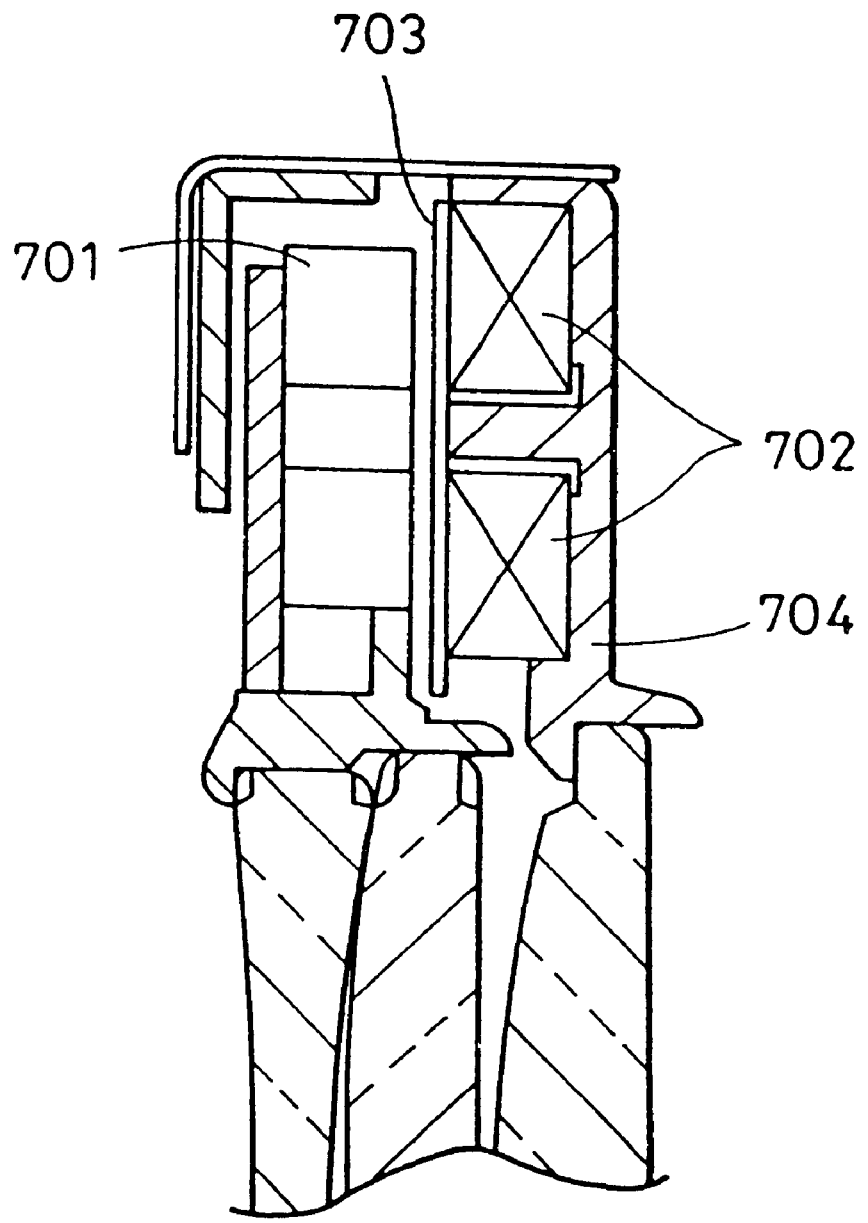
FIG. 16 is a sectional view showing a principal part of a fourth example of a conventional shake correcting apparatus.
Figure 17:
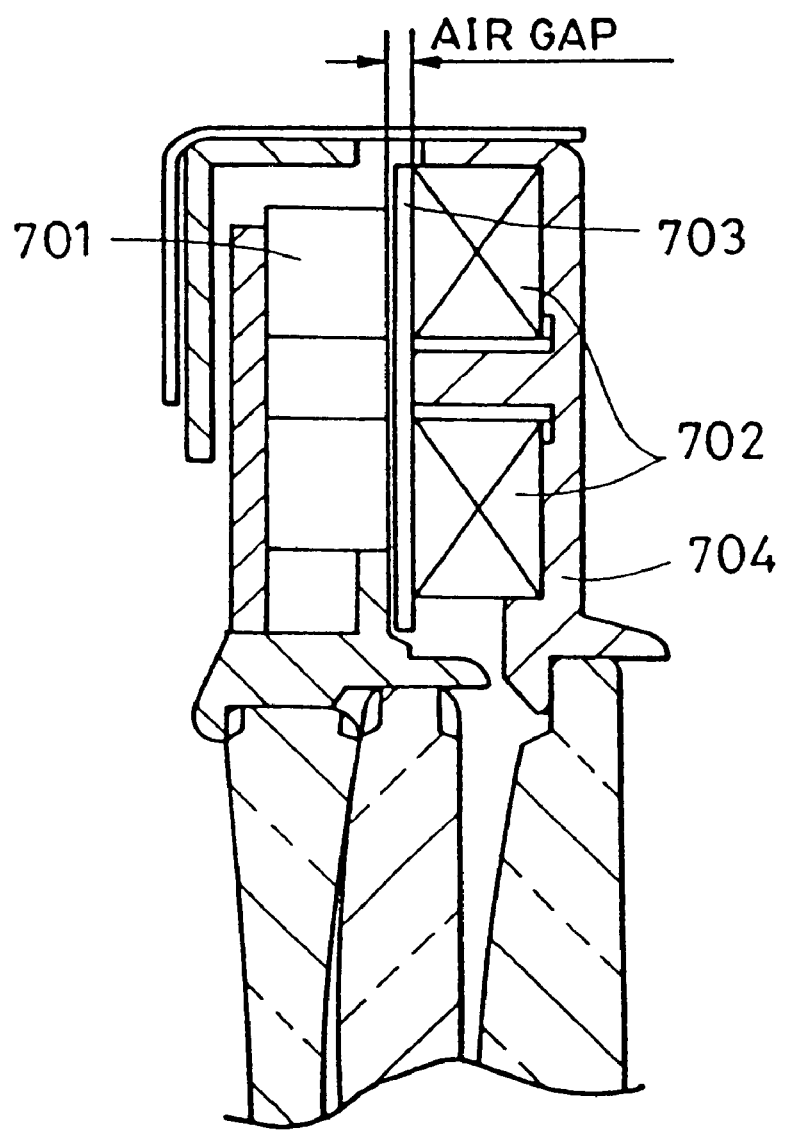
FIG. 17 is a sectional view showing a state in which an air gap between a permanent magnet and a coil shown in FIG. 16 is reduced.

FIG. 11 is a sectional view showing a configuration of the principal part of a camera having a shake correcting apparatus according to a third embodiment of the present invention, and corresponds to FIG. 7 according to the first embodiment described above. The configuration and operation of the camera elements other than those in FIG. 11 are the same as the first embodiment and the description thereof is omitted.

In FIG. 11, an image pick-up optical system group is formed of a first lens group lens L201a supported by an L201a lens holder 222 and attached to a bottom board 224, a correction lens L201b fixed to a supporting frame 223, a first lens group lens L201c fixed to the bottom board 224, and a second lens L202 (not shown) held by a second lens group lens holder (not shown).

A first lens group unit 220 attached to a first lens group lens barrel 214 and is formed of components, which will be described later, from the L201a lens holder 222 to a coil 230, a damper board 260, and first lens group lenses L201a to L201c, and advances in an optical axial direction. The components from the supporting frame 223 to the coil 230 coils 230a and 230b form a principal part of a shake correcting apparatus just like in the first embodiment described above. In addition, each coil 230 may be a coil unit formed of a coil 230 and a holding member (not shown) for unitarily holding the coil 230.

A yoke 225, a permanent magnet 226a, and the coil 230a are arranged as shown in FIG. 11 and form electromagnetic driving means just like in the first embodiment described above. In FIG. 11, a permanent magnet 226b and the coil 230b (not shown in FIG. 11) have the same arrangement as above. An adjusting member 263 for controlling the size of a gap is made of a non-magnetic material.

The coil 230a is attached to the adjusting member 263 which is selected to have a thickness 264 so as to maintain constant the size of a gap 262 between the coil 230a and the permanent magnet 226a from one apparatus to another apparatus during manufacturing. Furthermore, the adjusting member 263 is fixed between the coil 230a and the bottom board 224 so that the coil 230a opposes the permanent magnet 226a. The same structure and arrangement also are provided for permanent magnet 226b and coil 230b.

Thereby, even when the thickness of a coil 230 varies during manufacturing, the size of the gap 262 between a coil 230a and the permanent magnet 226a can be maintained constant by attaching an adjusting member 263 having the proper thickness 264 selected from plural adjusting members 263 prepared during manufacturing, so that variations in the driving force can be suppressed.

Shutter blades 231a and 231b are attached to the bottom board 224 and are opened and closed by a shutter driving device 232 comprising a known permanent magnet and a coil, etc., and disposed at a position having a different phase from the electromagnetic driving means formed of the yoke 225, the permanent magnet 226, and the coil 230 about an optical axis 227. A diaphragm retainer plate 233 is attached to the bottom board 224, and the lens L201c is attached to the diaphragm retainer plate 233.

The first lens group unit 220 formed of these components is attached to the first lens group lens barrel 214.

A camera having the shake correcting apparatus formed as above performs shake correction of a pitching shake and a rolling shake of the camera by using a vibration detecting device such as a known angular velocity meter and an angular acceleration meter and the computing unit shown in FIG. 9 just like in the first embodiment described above.

According to the third embodiment described above, in a camera having a correcting function that an image shake is corrected by driving a correcting system, a space for absorbing thickness variation in the coil 230 is provided on a side opposite an opposing surface between the coil 230 and the permanent magnet 226, so that even when the thickness of the coil 230 varies during manufacturing, the size of the air gap between the coil 230 and the permanent magnet 226 is fixed, thereby reducing variations in the driving force.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A shake correcting apparatus comprising:

a bottom board;

a supporting frame for supporting a shake correcting optical system; and an electromagnetic driving unit that drives the shake correcting optical system to perform shake correction, said electromagnetic driving unit comprising a coil unit attached to one of said bottom board and said supporting frame and a permanent magnet attached to the other one of said bottom board and said supporting frame, where said coil unit and said permanent magnet have opposing surfaces separated by a predetermined gap, wherein a space for accommodating a thickness variation of the coil unit is provided at the surface of the coil unit not opposing the permanent magnet, and wherein the permanent magnet is attached to the other one of said bottom board and said supporting frame by an adjusting member for adjusting the predetermined gap.

2. A shake correcting apparatus according to claim 1, wherein the adjusting member is a yoke.

3. A shake correcting apparatus comprising:

a bottom board;

a supporting frame for supporting a shake correcting optical system;

an electromagnetic driving device comprising a coil attached to one of said bottom board and said supporting frame and a permanent magnet attached to the other one of said bottom board and said supporting frame, where an electromagnetic driving force is generated between the coil and the permanent magnet by passing a current through the coil, and the supporting frame is driven by the driving force on a plane orthogonal to an optical axis, the coil and the permanent magnet each having a predetermined thickness; and a yoke fixed to the other one of said bottom board and said supporting frame, and further fixed to the surface not opposing the coil of the magnet, wherein the gap between the coil and the permanent magnet is independently set at a predetermined value by adjusting the thickness of the yoke.

4. A shake correcting apparatus comprising:

a bottom board;

a supporting frame for supporting a shake correcting optical system;

an electromagnetic driving device comprising a coil attached to one of said bottom board and said supporting frame and a permanent magnet attached to the other one of said bottom board and said supporting frame, where the electromagnetic driving device generates a driving force between the coil and the permanent magnet by passing a current through the coil, and said supporting frame is driven by the driving force on a plane orthogonal to an optical axis; and an adjusting member attached to one said bottom board and said supporting frame and provided on the surface not opposing the permanent magnet of the coil, said adjusting member having a predetermined thickness selected to set a size of a gap between the coil and the permanent magnet.

* * * * *

UNITED STATES PATENT AND TRADEMARK OFFICE
CERTIFICATE OF CORRECTION

PATENT NO.    : 6,587,270 B2
DATED         : July 1, 2003
INVENTOR(S)   : Shuichi Terada It is certified that error appears in the above-identified patent and that said Letters Patent is hereby corrected as shown below:

Column 6,
Line 8, "View" should read -- view --.

Column 12,
Lines 10 and 23, "above described" should read -- above-decribed --.

Column 16,
Line 43, "to one said" should read -- to one of said --.

Signed and Sealed this

Twenty-first Day of October, 2003

JAMES E. ROGAN
*Director of the United States Patent and Trademark Office*